Sept. 11, 1951  F. FAHLAND  2,567,328
LOAD-CARRYING STRUCTURE FOR VEHICLES
Filed May 4, 1950  4 Sheets-Sheet 1

Inventor
Frank Fahland
By
Dodge and Sons
Attorneys

Sept. 11, 1951 F. FAHLAND 2,567,328
LOAD-CARRYING STRUCTURE FOR VEHICLES
Filed May 4, 1950 4 Sheets-Sheet 2
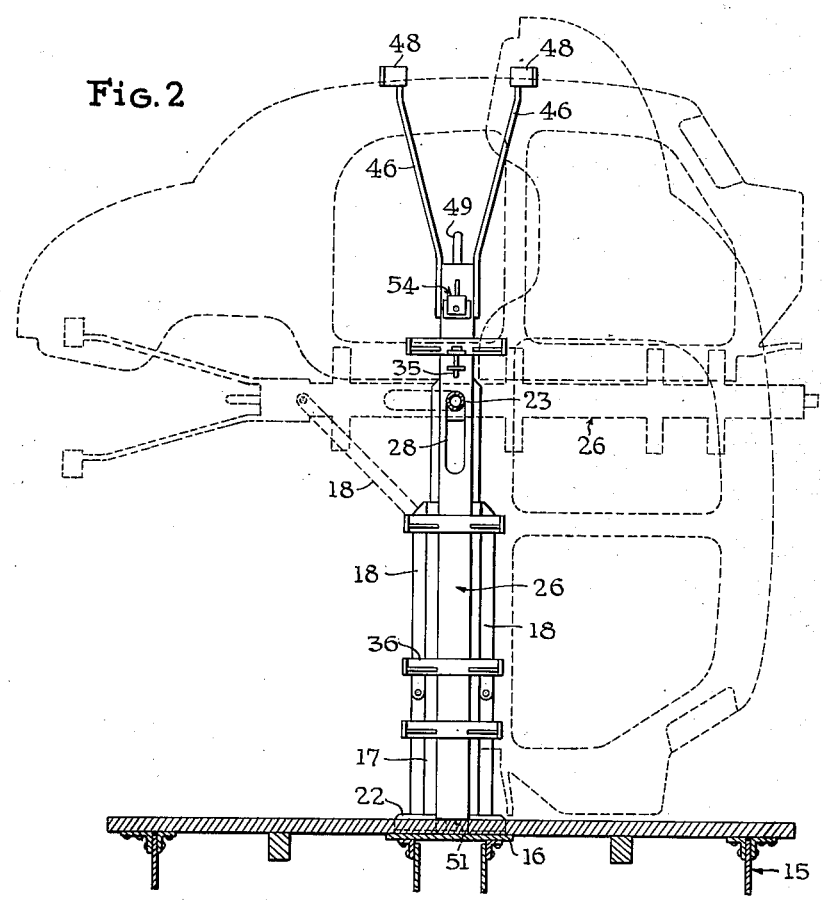
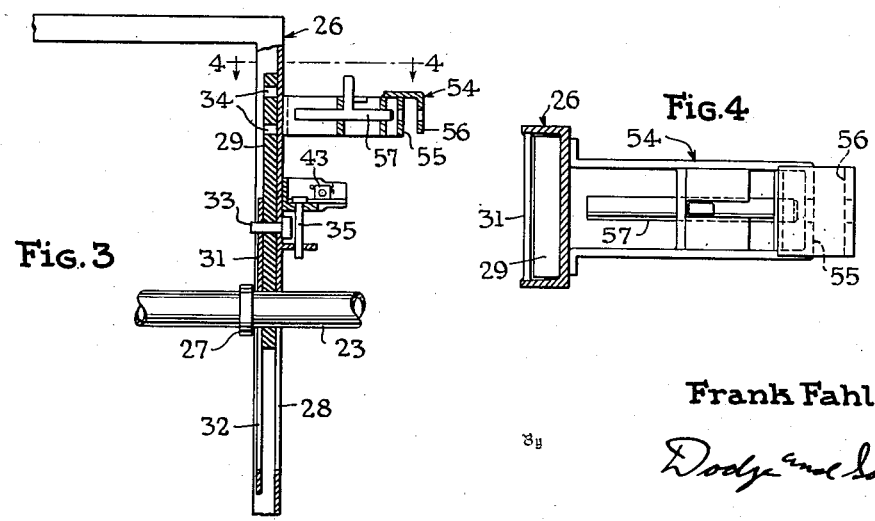
Inventor
Frank Fahland
Dodge and Son
Attorneys Sept. 11, 1951  F. FAHLAND  2,567,328
LOAD-CARRYING STRUCTURE FOR VEHICLES
Filed May 4, 1950  4 Sheets-Sheet 3

Inventor
Frank Fahland
By Dodge and Dodge
Attorneys

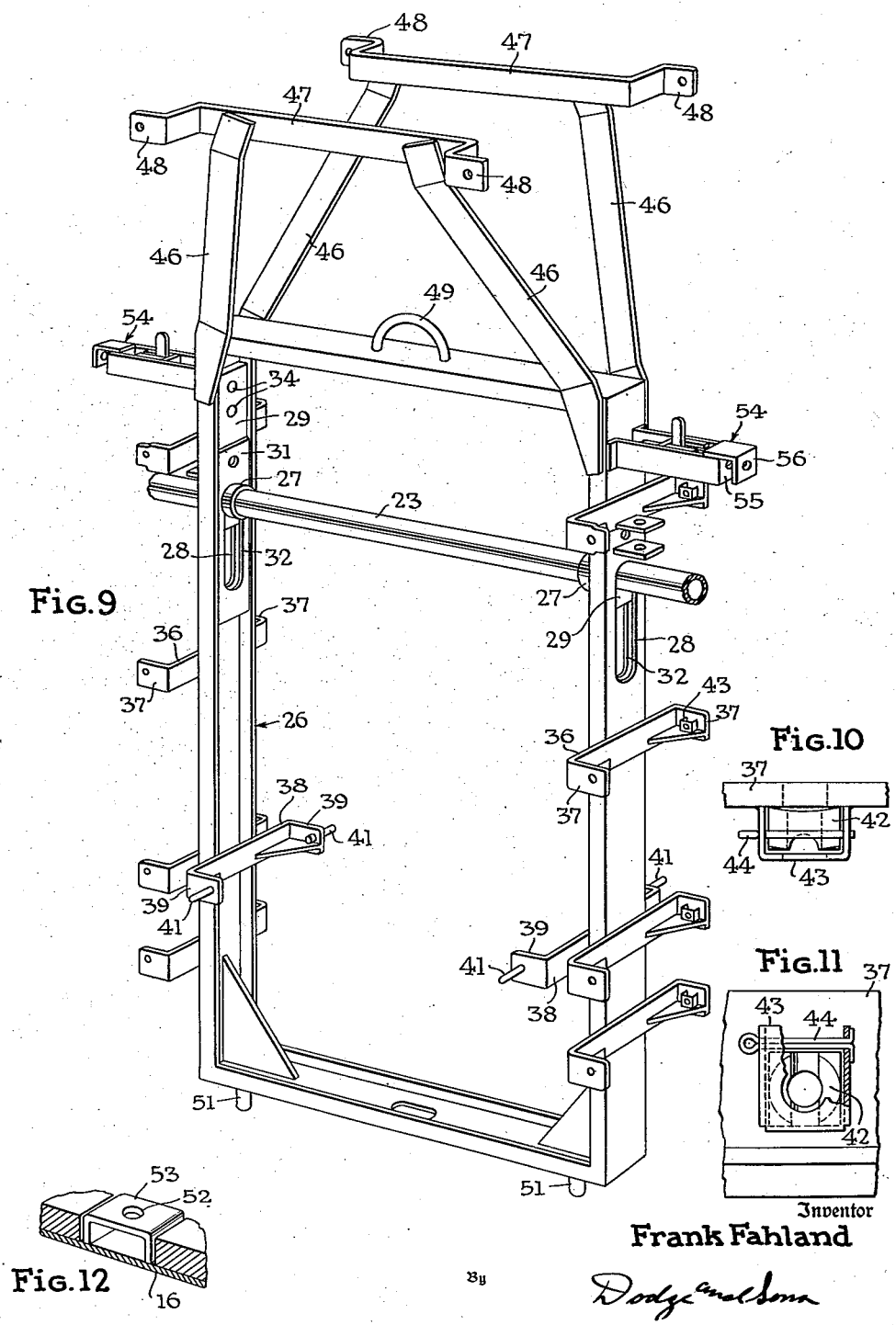

Patented Sept. 11, 1951

2,567,328

UNITED STATES PATENT OFFICE 2,567,328

LOAD-CARRYING STRUCTURE FOR VEHICLES

Frank Fahland, Omaha, Nebr.

Application May 4, 1950, Serial No. 160,047

9 Claims. (Cl. 105—368)

This invention relates to transport vehicles and particularly to freight cars especially equipped to transport bulky articles all of a standardized form in such a way that loading and unloading are facilitated and the danger of damage during loading and in transit is minimized. An important, but not the sole field for the use of the invention, is the transportation of automobile bodies.

Generally stated the invention provides means to support a plurality of double faced racks in vertical position along the longitudinal median plane of the freight car. These racks are provided with pads to which the automobile bodies are bolted. Each of the aforementioned racks is mounted and can be rotated on a horizontal axis. This axis passes approximately through the combined center of gravity of the rack and two bodies attached thereto.

The axis bearings on which the racks swing are not fixed but can be shifted relatively to the rack between two positions and can be fixed in each of said two positions. In one of these positions the rack rests directly on its end on the car deck so that the bearings do not sustain the vertical load during transport.

Preparatory to swinging the racks to their horizontal positions used for loading and for unloading, the bearings are shifted so that the racks are in a slightly elevated position in which they swing clear of the car deck. Thus, each rack has two vertical positions, a lower transport position and an upper position which permits its rotation. It has two horizontal loading and unloading positions in which respectively the opposite faces of the racks are presented upward.

With the construction described a simple hoisting apparatus alongside the track on which the car runs, can be used to lift the racks from their transport position to their elevated vertical position, and can also be used to swing the racks to the respective horizontal loading positions. It can also be used to lower the bodies successively onto the horizontally positioned racks and to remove them therefrom. In their horizontal positions the racks are retained by diagonal braces which extend between each rack and the stanchions which support the horizontal bearing.

As a consequence of the described construction loading and unloading are each facilitated and the structure on which the racks are supported need not be unduly heavy because during transport the weight of the racks and the attached bodies is sustained directly on the car.

An embodiment of the invention which has already demonstrated utility in actual service is illustrated in the accompanying drawings in which:

Fig. 1 is a fragmentary elevation of a flat car and shows two of a series of eight racks constructed according to the invention mounted thereon, the deck of the car being shown in medial longitudinal section. Both racks are shown in their lower vertical (transport) positions.

Fig. 2 is a view in which the deck of the car is shown in vertical transverse section and the body supporting mechanism is shown in elevation. The rack is shown in full lines in its vertical transport position and in dotted lines in one of its two horizontal positions used for loading and unloading. As to both positions the outline of a supported automobile body is indicated in broken lines.

Fig. 3 is a fragmentary view partly in section showing one of the two shiftable bearing arrangements used for each of the racks, and the means by which the bearing member is pinned selectively in its two positions. This view also shows the latch for engaging one of the diagonal braces used to hold the rack in its horizontal positions.

Fig. 4 is a section on the line 4—4 of Fig. 3 but drawn on a somewhat larger scale than Fig. 3.

Figure 1:
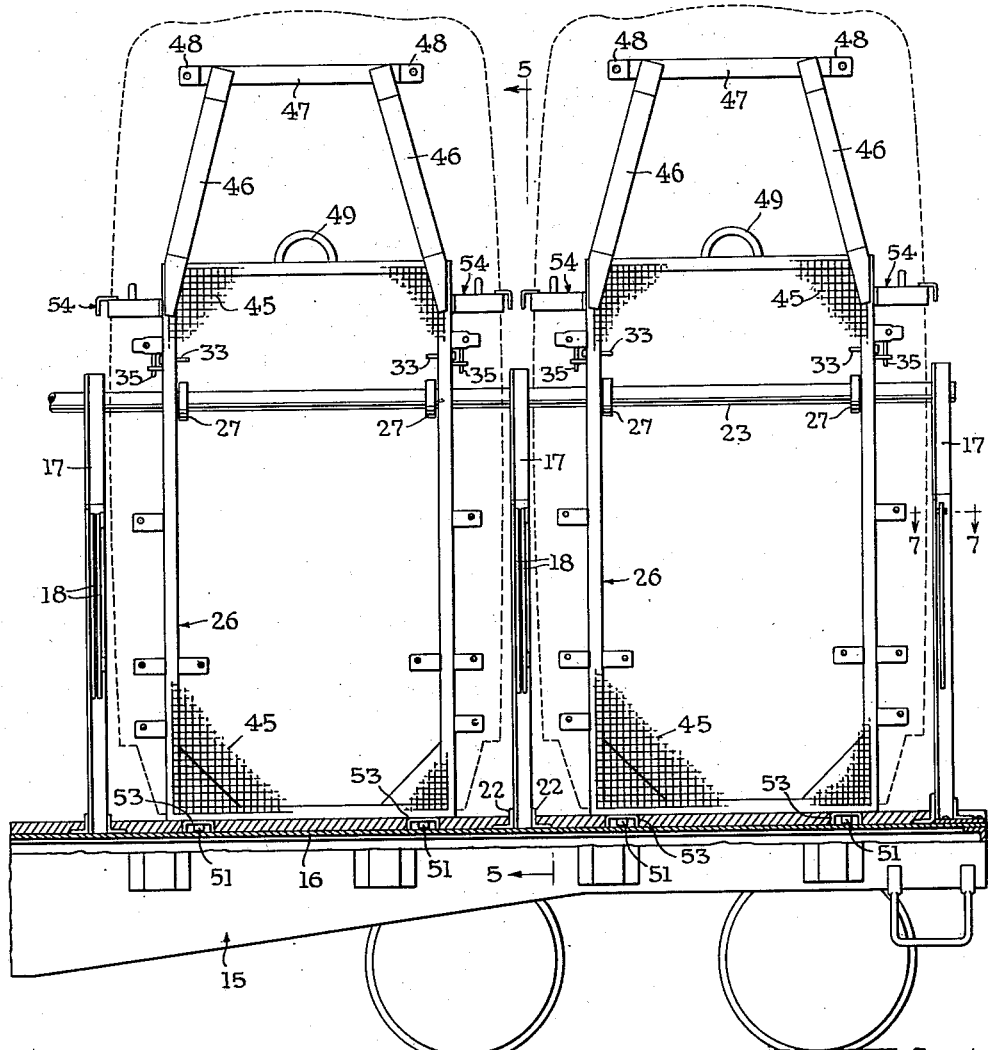
Figure 5:
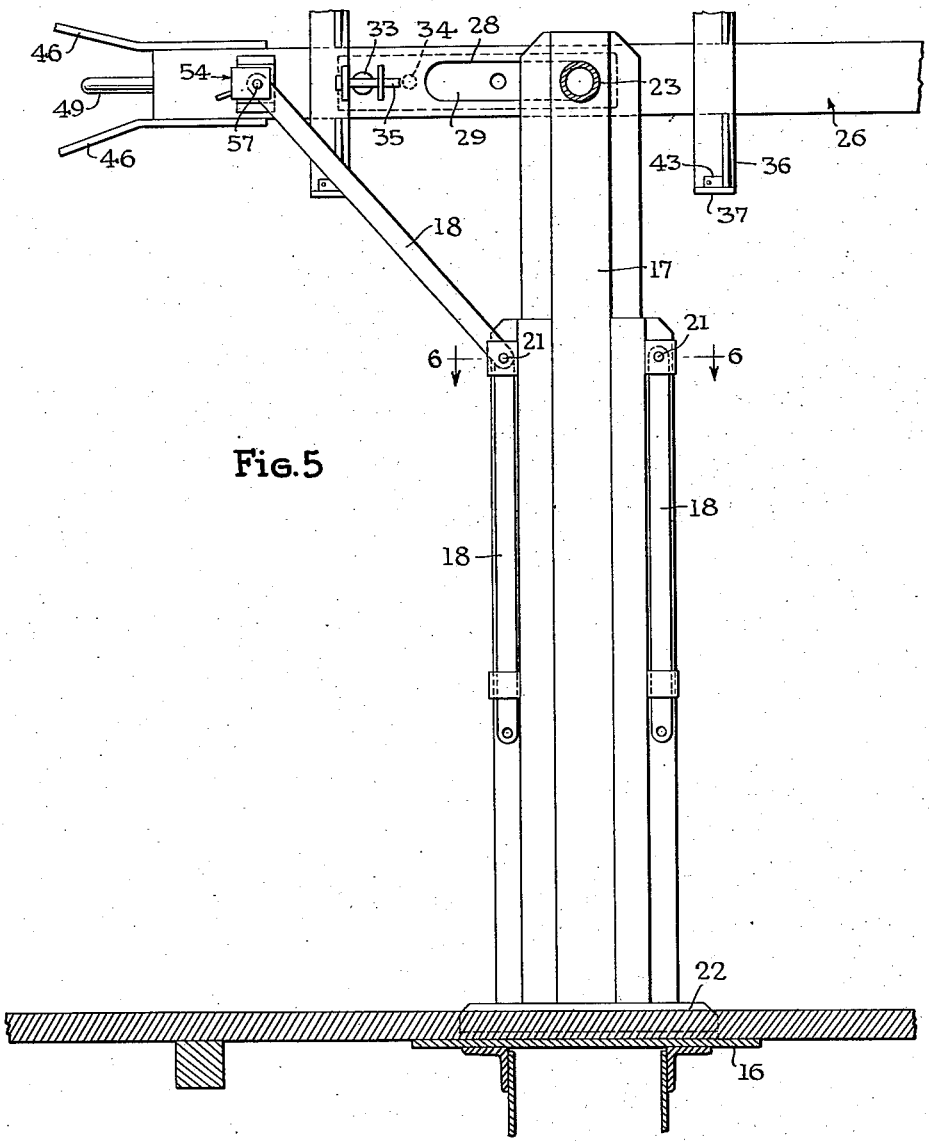

Fig. 5 is a section on the line 5—5 of Fig. 1 but drawn on a larger scale. One of the racks is shown in its horizontal position. The end portions of the rack are broken away in this view.

Figure 6:
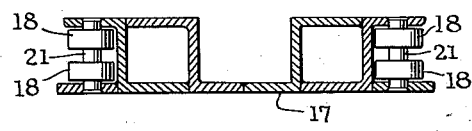

Fig. 6 is a section on the line 6—6 of Fig. 5.

Figure 7:
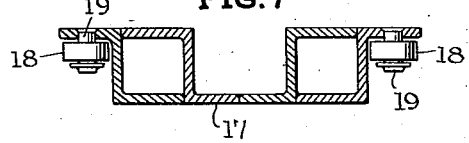

Fig. 7 is a section on the line 7—7 of Fig. 1.

Figure 8:
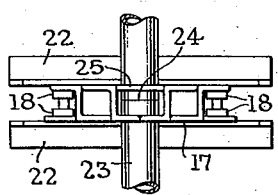

Fig. 8 is a plan view of one of the stanchions.

Fig. 9 is a perspective view of one of the double faced racks shown mounted on the horizontal bar on which it turns. The bearings are shown as they would be in the transport position. In this view the netting which is attached to one face of the rack has been omitted.

Fig. 10 is an edge view of a nut retainer.

Fig. 11 is a face view of the same nut retainer with portions broken away to show the internal construction.

Fig. 12 is a view of the socket used to receive positioning fingers on the racks when the latter are in their vertical transport position.

Refer first to Figs. 1, 2 and 5. The car frame is generally indicated by the numeral 15 and has a center sill the upper portion of which is a plate 16. Spaced throughout the length of the car and alined on the longitudinal center line of the car are a plurality of spaced stanchions generally indicated by the numeral 17. The stanchions are substantially identical except that the end ones carry only two adjustable diagonal braces, whereas the intermediate stanchions carry four.

In the example illustrated, and as best shown in Figs. 6 and 7, a satisfactory stanchion can be constructed by welding four Z-bars to form a generally rectangular column which is wide in the direction transverse to the car. One of the end columns appears in Fig. 7 which clearly shows the cross section of the Z-bars and the welds. These end stanchions carry two diagonal braces 18 hinged thereto on the studs 19. The intermediate stanchions shown in Fig. 6 require four diagonal braces 18 and consequently include an extra bar welded to the outer Z-bar so that both ends of the cross pins 21 on which its braces 18 are mounted are supported. The particular construction of these stanchions is not vital and is controlled largely by the material readily available.

The stanchions are connected to the top plate 16 of the center sill by welding the ends of the stanchions thereto. Short lengths of angle iron 22 are welded to the plate 16, and also to the stanchions. In this way the structure affords what amounts to a combined pad and gusset plate permitting the omission of any other lateral bracing of the stanchions. External bracing was tried and was found to be objectionable because it obstructed the deck.

A horizontal bearing bar 23 is supported by the stanchions near their upper ends and extends horizontally from end to end of the car. As a matter of convenience it is constructed of heavy pipe. Since such pipe is commonly available in lengths shorter than the overall length of the car, it is necessary to provide a strong, simple joint construction.

Such a joint is illustrated in Fig. 8 where the ends of sections of pipe 23 meet on the line 24. The abutting ends of the pipe are welded and in addition a filler plate 25 is inserted and is welded to the inner Z-bars so that the pipe 23 is sustained positively by the stanchions on both sides of the joint. As a practical matter the pipe 23 merely affords trunnions on which the racks generally indicated by the numeral 26 swing.

A continuous rod such as 23 is believed to afford the most rigid light construction available, but the essential thing is that there be two trunnions on which the rack 26 can swing. The possibility of adopting other journal constructions is fully recognized.

Collars 27 are used to position the racks on the pipe 23. The pipe 23 passes through longitudinal slots 28 formed in the webs of the channel irons of which the racks 26 are fabricated (see Figs. 2, 3 and 9). A heavy plate 29 (see Figs. 3 and 4) is then positioned against the web of the channel iron and confined between the flanges. It is also confined by a cover plate 31 (see Fig. 3) which is welded to the flanges of the channel and which has a slot 32 coextensive with and directly opposite the slot 28. The plate 29 has a circular opening through which the pipe 23 passes and which serves as a bearing on which the rack 26 swings. The rack 26 is shiftable in the direction of its length on the plates 29 to either of two vertical positions. A pin 33 serves to retain the racks 26 in either of these positions.

In the positions shown in Figs. 3 and 9, the rack 26 is in its lower or transport position. Upon removal of the pin 33, the rack 26 can be lifted and the pin re-inserted in either of the vertically alined holes indicated at 34 in Fig. 3. A proper choice of these holes 34 depends upon the location of the center of gravity of the racks 26 and the attached automobile bodies, it being desirable to have the center of gravity as near the axis of rotation of the rack 26 as possible. It will be understood, of course, that there is a plate 29 at each side of the rack 26 and that consequently there are two pins 33 which must be removed and replaced when the racks are shifted as above suggested. A retainer pin 35 is used as a convenient means for preventing the escape of the pin 33.

The perspective view of Fig. 9 gives the clearest idea of the structure of the rack 26 and reference should be made particularly to that figure.

On the longitudinal members of the rack 26 are several U-shaped irons 36 each of which has two pads 37 one for each face of the rack 26. On the inner face of each side member is one stirrup member 38 with two pads 39 one for each face of the rack. The pads 39 are each provided with positioning pins 41.

When the rack is in its horizontal position these pins position the body as it is lowered onto the rack after which the body is attached to the rack by bolts inserted through holes in the body and threaded into nuts 42 associated with each of the pads 37. While these nuts might be applied by hand, it is desirable to provide means such as that shown in Figs. 10 and 11 to maintain them always in place. For this purpose small clips 43 are welded to the rear faces of the pads 37. Each clip confines a square nut which is the nut 42. These nuts can be removed upon removal of a cotter pin 44.

The nuts 42 are preferably of a special thread gripping type and after repeated use deteriorate because of wear. The cotter pin 44 permits the convenient replacement of worn nuts. The retention of the nuts greatly simplifies the insertion of the bolts which in practice are turned by the use of a power wrench.

One entire face of the rectangular frame of rack 26 is covered with heavy netting, a part of which is indicated at 45 in Fig. 1. This netting supports the workmen during certain of the loading operations. Each frame has at one end (the upper end as viewed in Figs. 1, 2 and 9) certain extensions in the form of arms 46 with cross members 47. These are provided with pads 48 for connection to the extreme rear portion of the body.

An eye 49 is mounted on the upper cross member of the frame of the rack 26 and serves as means for attaching the hoisting gear when the rack 26 is shifted between its lower transport position and its upper hinged position. The lower cross member of the frame of the rack 26 has two projecting pins 51. These are received in sockets 52 in the deck of the car. These sockets 52 are visible in Fig. 1 and more clearly illustrated in Fig. 12. They are simply holes punched in the webs of short channel sections 53. These are mounted with their flanges downward, the flanges being welded to the plate 16. Their function is to position the rack positively in its lowered or transport position.

After the rack 26 has been elevated from its transport position and fastened to the plate 29, by inserting the pins 33 through the selected holes 34, the rack is ready to be swung to horizontal position. After it has been swung to the horizontal position (see Fig. 5) the appropriate ones of the braces 18 are swung up as indicated in Fig. 5 and fastened to brackets such as those generally indicated by the numeral 54 (see also Fig. 9)

The bracket 54 is shown in detail in Figs. 3 and 4 and has two spaced keepers 55 and 56 provided with alined openings for a shiftable bolt 57. After the brace 18 is swung into position between plates 55 and 56, the bolt 57 is shot. This attaches the upper end of the brace 18 to the rack and offers a reliable method of maintaining the horizontal position of the rack.

An examination of Fig. 1 will make it clear that a diagonal brace is needed at each side of each rack 26. As indicated in Fig. 5 the braces on the left side of the car are used in one horizontal position. The braces on the right side of the car will be used to maintain the rack 26 in the other horizontal position. Further the stanchions 17 at the end of the car need have only two braces 18, i. e. one on each side, whereas the intermediate stanchions each are provided with four such braces.

Operation

When a car comes in for loading, all of the racks 26 will be in their lowered vertical positions. The first operation is to remove the pins 33, lift each rack, and insert the pins 33 in the selected holes 34. The racks are then swung to a chosen horizontal position and secured in such position by attaching a diagonal brace 18 to each side of rack 26.

It is considered better practice to bring all the racks to horizontal position before loading starts because the racks offer platforms on which the workmen may move about and because it removes the risk of damage to bodies such as might be occasioned by striking the upwardly projecting ends of unloaded racks.

The next operation is to place a body on each horizontally positioned rack and bolt it in place. In this operation the workmen can enter the bodies and insert the bolts. The next operation is to invert the racks and attach another body to each rack. The next operation is to swing the racks to their vertical positions. Since the racks are in an elevated position at this time, there is ample clearance for the swinging motion and the attached bodies clear the car deck.

After loading the racks are individually returned to the vertical position. Pins 33 are withdrawn and the racks 26 are individually lowered to the transport position. In transport position the studs 51 engage the sockets 52 whereby the racks and the attached bodies are retained against shifting in transit.

After the racks have been lowered, it is desirable to re-insert the pins 33 because they will retain the racks 26 against vertical motion. The effect of this final adjustment is to relieve the member 23 of vertical load, a circumstance that makes it possible to design the stanchions and the member 23 more lightly than would otherwise be necessary.

A number of details of the structure have been described with considerable particularity notwithstanding the fact that they are subject to possible variation as will be apparent to persons skilled in the art. No limitations to the particular details of construction is implied.

I claim:

1. The combination of a vehicle platform; means affording a horizontal-axis bearing spaced above said platform; at least one rack journaled on said bearing and having on opposite faces of the rack seats for articles to be transported; means for releasably attaching said articles to said seats; means for fixedly positioning said rack on said bearing in either of two horizontal positions in which respectively opposite faces are presented upward; and means for fixing said rack in a substantially vertical position, the rack being capable, when loaded with said articles, of turning on said bearing to any of said positions.

2. The combination defined in claim 1 in which means are provided to engage and support the rack directly by said platform when the rack is in said vertical position, so that the bearing is then relieved of vertical load.

3. The combination of a vehicle platform; means affording a horizontal-axis bearing spaced above said platform; at least one rack journaled on said bearing said rack having on opposite faces seats for articles to be transported; means for releasably securing said articles to said seats; said rack when vertical being shiftable between upper and lower positions relative to said bearing; means to secure said rack selectively in said upper or lower position, said bearing being relieved of vertical load, when said rack is in said lower position, said rack when in said upper position being capable of being swung to either of two horizontal positions in which respectively opposite faces are presented upward; and means for securing said rack in either of said horizontal positions.

4. The combination of a vehicle platform; means affording a horizontal-axis journal spaced above said platform; at least one pair of spaced bearing plates journaled thereon; a rack carried by each pair of bearing plates; said rack having on opposite faces thereof seats for articles to be transported; means for releasably securing articles to said seats, said rack having a lower vertical transport position, and being shiftable on said plates to a raised vertical position; means to secure said rack to said plates in either of said vertical positions; said rack being capable of swinging from said raised vertical position to either of two substantially horizontal positions in which respectively opposite faces are presented upward; and means to retain said rack in either of said horizontal positions.

5. The combination of a transport vehicle having a deck; a plurality of stanchions carried by said vehicle, projecting upward from said deck and spaced along the longitudinal center line of said vehicle; a horizontal rod extending from stanchion to stanchion; pairs of spaced bearing plates journaled on said rod between adjacent stanchions; a plurality of racks, each rack being carried by one of said pairs of bearing plates, and having on opposite faces thereof pads for the attachment of articles to be transported, said racks having a vertical transport position in which the lower ends of said racks rest on said deck; means effective when said racks are in said transport position to interlock said racks and said deck to prevent horizontal shifting of said racks, said racks being slidable in the direction of their length relatively to said pairs of bearing plates between upper vertical positions and lower vertical transport positions; means for fixing said racks to said bearing plates in said upper positions, said racks being then capable of being swung to either of two substantially horizontal positions in which respectively opposite faces are presented upward; means extending between said stanchions and said racks, engageable to retain said racks in either of said two substantially horizontal positions.

6. The combination defined in claim 5 in which the means for fixing the racks to the bearing plates are also effective, in the lower or transport positions of the racks, to prevent vertical shifting of the racks.

7. In the combination defined in claim 5 a foraminous web attached to one face of each of said racks adapted to serve as a platform when said racks are in their horizontal positions.

8. The combination of a vehicle platform; means affording a horizontal-axis journal spaced above said platform; at least one pair of spaced bearing plates journaled thereon; a rack carried by each pair of bearing plates; said rack having on opposite faces thereof seats for articles to be transported; means for releasably securing articles to said seats, said rack having a lower vertical transport position, and being shiftable in the direction of its length relatively to said plates to a plurality of raised vertical positions; means to secure said rack in said transport position; means to secure said rack selectively in any one of said raised vertical positions, said rack being capable of swinging from any selected raised vertical position to either of two substantially horizontal positions in which respectively opposite faces are presented upward; and means to retain said rack in either of said horizontal positions.

9. The combination defined in claim 8 in which said rack rests directly on said platform when in said transport position whereby said bearing is relieved of vertical load; and means to engage said rack directly by said platform when the rack is in said transport position whereby horizontal movement of the rack is inhibited.

FRANK FAHLAND.

REFERENCES CITED

The following references are of record in the file of this patent:

UNITED STATES PATENTS

| Number | Name | Date |
|---|---|---|
| 2,123,362 | Isaacson | July 12, 1938 |
| 2,129,950 | Loney | Sept. 13, 1938 |
| 2,151,431 | Lord | Mar. 31, 1939 |